United States Patent

[11] 3,596,117

| [72] | Inventor | Egon Andresen Darmstadt, Germany |
|---|---|---|
| [21] | Appl. No | 16,012 |
| [22] | Filed | Mar. 3, 1970 |
| [45] | Patented | July 27, 1971 |
| [73] | Assignee | Licentia Patent-Verwaltungs-G.m.b.H. Frankfurt, Germany |
| [32] | Priority | Mar. 5, 1969 |
| [33] | | Germany |
| [31] | | G 69 09 713 |

[54] LINEAR INDUCTION MHD GENERATOR
1 Claim, 2 Drawing Figs.

[52] U.S. Cl. .................................................. 310/11
[51] Int. Cl. .................................................. H02m 4/02
[50] Field of Search ...................................... 310/11, 216; 417/48, 50; 315/111

[56] References Cited
UNITED STATES PATENTS

| 2,770,196 | 11/1956 | Watt | 310/11 X |
| 2,786,416 | 3/1957 | Fenemore | 310/11 X |
| 397,340 | 2/1889 | Cohen | 310/216 (UX) |

Primary Examiner—D. X. Sliney
Attorney—Spencer & Kaye

ABSTRACT: A linear induction MHD generator having an annular flow channel and an inner core formed of a plurality of axially extending iron wires grouped so that the core has a circular cross section.

PATENTED JUL 27 1971 3,596,117

Inventor:
Egon Andresen

BY *Spencer & Kaye*
ATTORNEYS.

LINEAR INDUCTION MHD GENERATOR

BACKGROUND OF THE INVENTION

The present invention relates to the construction of the stator laminations of a linear induction MHD generator having an annular flow channel.

Such a stator is used—as in other electric induction generator—to conduct the magnetic flux, and, therefore, it must be laminated so that the occurrence of eddy currents within it will be substantially prevented.

In MHD generators of the type having an annular flow channel, the stator laminations form a yoke about the stator windings and the flow channel. The channel is surrounded by the windings and the laminations include one portion disposed to the outside of the windings and another portion enclosed by the channel to form a core. This arrangement presents difficulties, however, with regard to the construction of the stator laminations enclosed by the flow channel because this core is composed of laminations which must aubt one another at the center of the core. This results in the laminations being shaped in the form of sector-shaped wedges. It is, thus, necessary to form the sheets of material used to make the core laminations in such a manner that the individual laminations can be stacked in the inner core to form a cylinder. This type of machining and the subsequent stacking operations, however, are complicated and, thus, expensive.

SUMMARY OF THE INVENTION

It is an object of the present invention to provide stator laminations for linear induction MHD generators having an annular flow channel in which the disadvantages set out above are eliminated.

This is accomplished according to the present invention by providing a ferromagnetic interior consisting of a plurality of iron wires which are disposed parallel to the axis of the flow channel and which are grouped together so as to have a circular cross section.

An advantage of this type of construction is that it avoids eddy currents in the inner core, while being extremely simple and economical at the same time.

DESCRIPTION OF THE PREFERRED EMBODIMENTS

Figure 1:
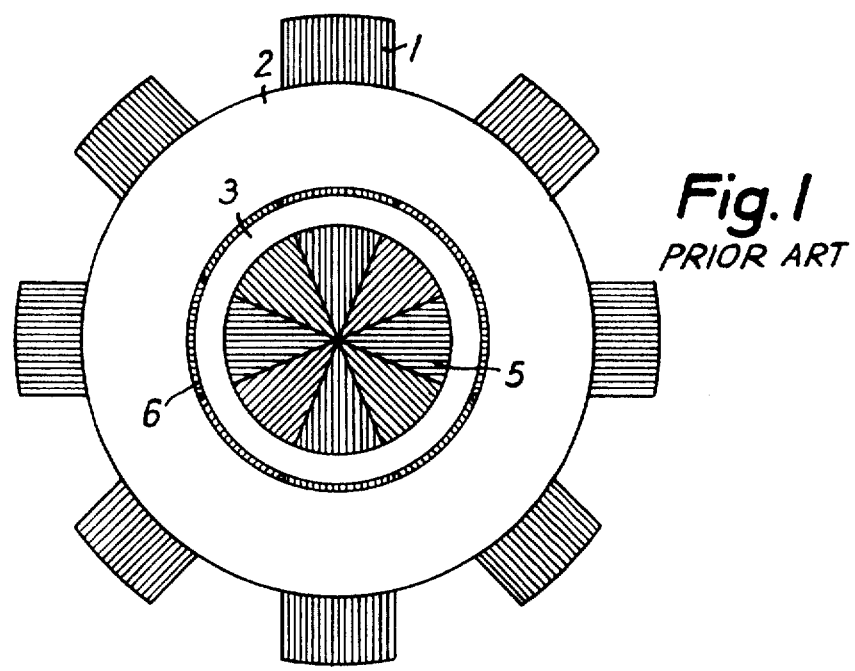
FIG. 1 is a cross-sectional end view of an annular flow MHD generator according to the prior art.

FIG. 1 shows the conventional, or prior art, laminated construction of the inner core of a MHD generator having an annular flow channel. The stator laminations 1 form a yoke about electric windings 2, a channel wall 6 and flow channel 3. A suitable gas plasma flows through the flow channel 3 in a direction perpendicular to the plane of FIG. 1. The inner core 5, which is delimited and surrounded by the annular flow channel 3, is composed of portions of the stator laminations 1. These stator laminations 1 abut against one another so that their cross sections form a circle. The machining of the laminations 1 for the inner core 5 so that their cross sections are a sector of a circle is—as already mentioned—very expensive and generally disadvantageous.

Figure 2:
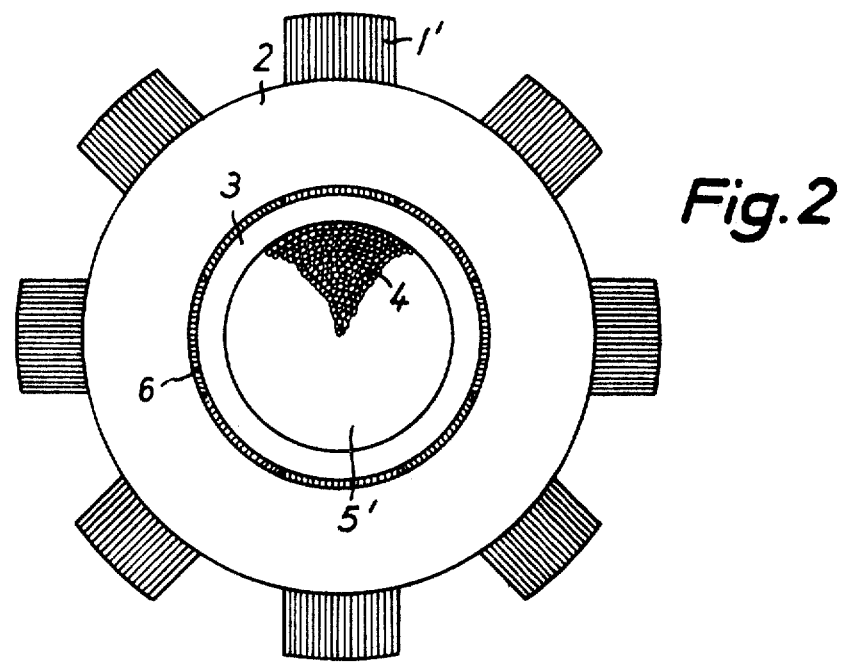
FIG. 2 is a cross-sectional end view, similar to FIG. 1, of an annular flow MHD generator according to the present invention.

The present invention proposes to overcome these disadvantages by providing an inner core as shown in FIG. 2. The MHD generator shown here is similar to that shown in FIG. 1, with the exception that the stator laminations 1' do not extend through the inner core 5'. In FIG. 2, the inner core 5' is composed of a plurality of iron wires 4, which are disposed parallel to the direction of flow of the gas plasma through the flow channel 3. Such a bundle of wires can be simply constructed and inserted into the interior of the generator. The wires 4 are grouped so as to have a circular cross section. The wires are suitably insulated from one another.

The inner core 5' shown in FIG. 2 as well as the inner core 5 of FIG. 1 in the usual manner are kept in the center of the flow channel 3 by (not shown) spokes extending through the flow channel 3 to the channel wall 6. Such a construction is described and shown, e.g., in the German Auslegeschrift No. 1 121 203.

It will be understood that the above description of the present invention is susceptible to various modifications, changes and adaptations, and the same are intended to be comprehended within the meaning and range of equivalents of the appended claim.

I claim:

1. In a linear induction MHD generator having an annular flow channel, an electric winding, stator laminations, and an inner core enclosed by, and defining the inner boundary of, the channels, the improvement wherein said core is composed of a plurality of iron wires arranged adjacent to one another and parallel to the axis of the flow channel and grouped so as to impart a circular cross section to said core.